F. P. BAUMAN.
DRY BATTERY.
APPLICATION FILED FEB. 18, 1916.

1,267,620.

Patented May 28, 1918.

Witnesses:
Conrad Boltshauser
Otto Pletscher

Inventor:
Ferdinand P. Bauman

UNITED STATES PATENT OFFICE.

FERDINAND PAUL BAUMAN, OF KÜSNACHT, SWITZERLAND.

DRY BATTERY.

1,267,620.

Specification of Letters Patent.

Patented May 28, 1918.

Application filed February 18, 1916. Serial No. 79,198.

*To all whom it may concern:*

Be it known that I, FERDINAND PAUL BAUMAN, a citizen of the Swiss Confederation, residing at Küsnacht, Canton Zurich, Switzerland, have invented new and useful Improvements in Dry Batteries, of which the following is a specification.

The invention relates to an improved dry battery of the kind which is provided with plate electrodes and carbon electrodes impregnated with impervious substances and having a cavity at one side for the reception of a soft electrolyte which is in contact with the negative electrode which latter is always disposed adjacent the positive electrode of the next element or couple of the battery.

The novel feature of my invention resides in that the carbon electrodes are impregnated to a suitable depth at the face rearward of the cavity only; that the impregnating substance provides only at the surface of the electrode a complete filling layer for the pores; and that the said carbon electrodes each carry at the impregnated surface a metal frame which faces and rests against the negative electrode.

Figure 1:
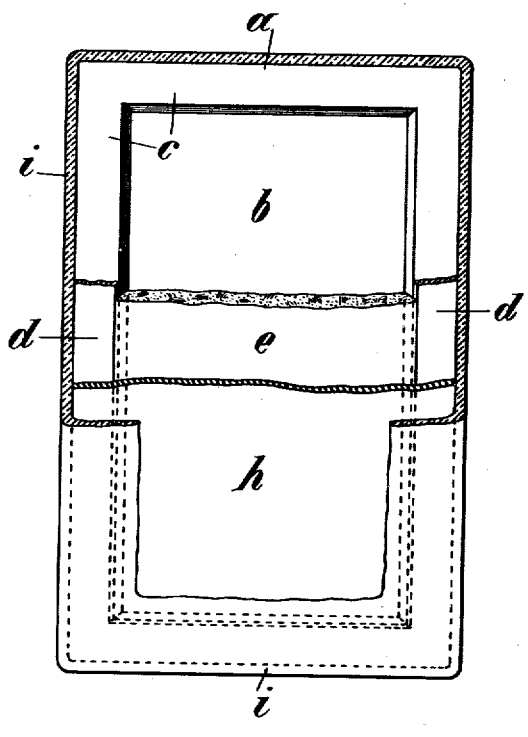
Figure 2:
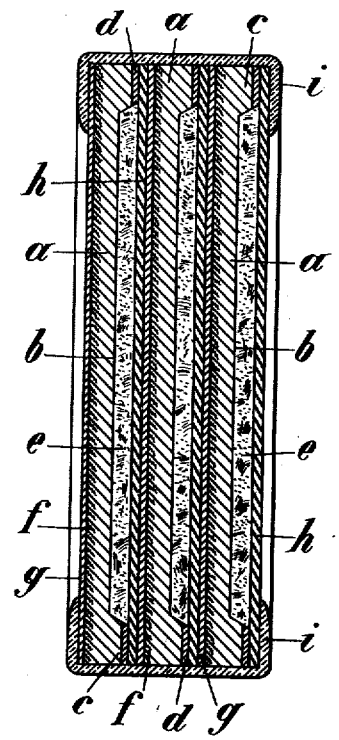

Reference is now had to the accompanying drawing, in which:

Figure 1 is a fractional front elevation, and Fig. 2, a vertical section of one form of my improved dry battery.

In this form of battery, shown by way of an example, it is presumed that the elements in respect of materials are built on the Leclanché system. The battery is composed of three couples of plate-electrodes. The positive electrode *a*, consisting of a mixture of manganese dioxid and graphite, has on one side the cavity *b* surrounded by a border *c* to which is applied an insulating layer *d*. In the cavity *b* of each element is filled a pasty electrolyte *e* containing ammonia-solution that is to say ammonium hydroxid, said electrolyte being flush with the surface of the insulating layer *d*. On the opposite side to that having the cavity *b*, the electrodes *a* are impregnated to a suitable depth in the pores with a filling substance or mass *f* such as paraffin. The impregnation prevents the damp, drawn by the electrolyte *e* into the electrode *a*, from passing through to the opposite side. Over each of the impregnated sides of the electrode is applied a thin covering *g* of good conducting material such for example as copper. The application of the covering is advantageously carried out in the galvanic manner by deposition, to form a coating of good conducting material, for example copper, applied so as to establish intimate contact between the carbon electrode of the one element and the zinc of the adjacent element. Each element comprises, adjacently to the electrolyte *e* and insulating layer *d*, a negative zinc-electrode *h*. The three elements forming the battery are placed close together with the opposite poles of the electrodes. The coverings *g* rest against the zinc plates *h* and insure a good permanent contact between the several elements.

For keeping the battery securely together a non-conducting sheath *i* is provided which may be of paraffin for example. The finished battery forms a compact body and can be easily introduced in any electric circuit.

The improved battery has, in comparison with the usually known batteries, the advantage of being easily and cheaply manufactured. The same is especially advantageous for pocket lamps, these being hitherto furnished with batteries of more or less difficult construction requiring great care and accuracy in fitting and imposing an elevated price for the lamp.

I claim:—

A dry battery of the kind having plate electrodes of which the carbon electrodes are impregnated with impervious substances and formed with a cavity at one side for the reception of soft electrolyte which is in contact with the negative electrode each of which latter is in contact with the positive of the adjacent element, fitted with carbon electrodes impregnated to a suitable depth at the face rearward of the cavity only where the impregnating substance is made to form only a complete surface filling layer for the pores, and a metal frame applied to the impregnated face of each carbon electrode to serve as solid contact portion with the adjacent negative electrode.

FERDINAND PAUL BAUMAN.

Witnesses:
 CONRAD BOLESHAUSER,
 CARL GUBLER.